(12) United States Patent
Peterson

(10) Patent No.: US 6,848,525 B1
(45) Date of Patent: Feb. 1, 2005

(54) LIFT FOR VEHICLE HOODS AND THE LIKE

(76) Inventor: Edward A. Peterson, P.O. Box 63, Chelsea, OK (US) 74016

( * ) Notice: Subject to any disclaimer, the term of this patent is extended or adjusted under 35 U.S.C. 154(b) by 0 days.

(21) Appl. No.: 10/295,394

(22) Filed: Nov. 15, 2002

Related U.S. Application Data

(60) Provisional application No. 60/332,691, filed on Nov. 16, 2001.

(51) Int. Cl.[7] .............................................. B62D 25/10
(52) U.S. Cl. .................................... 180/69.2; 180/69.21
(58) Field of Search ............................. 180/69.21, 69.2, 180/89.17, 69.23, 69.24, 89.13, 89.14, 89.15; 296/55, 57.1, 56, 146.8, 146.11, 146.12, 76, 146.4, 107.16; 16/289, 357, 358, 361; 92/65; 83/155

(56) References Cited

U.S. PATENT DOCUMENTS

| | | | | |
|---|---|---|---|---|
| 2,205,683 A | * | 6/1940 | Claud-Mantle | 180/69.2 |
| 2,737,254 A | * | 3/1956 | Bayley | 180/69.21 |
| 2,826,256 A | * | 3/1958 | Haltenberger | 180/69.21 |
| 3,732,784 A | * | 5/1973 | Vogelei et al. | 92/65 |
| 5,287,781 A | * | 2/1994 | Fehr et al. | 83/155 |
| 5,760,695 A | * | 6/1998 | Huber | 296/107.16 |
| 5,975,228 A | * | 11/1999 | Parfitt | 180/69.21 |
| 6,059,346 A | * | 5/2000 | Moon | 296/76 |
| 6,367,864 B2 | * | 4/2002 | Rogers et al. | 296/146.4 |

* cited by examiner

*Primary Examiner*—Hau Phan
(74) *Attorney, Agent, or Firm*—Gregory J. Nelson

(57) ABSTRACT

A lift for opening and closing truck hoods. The lift has a primary actuator with a pair of upper and lower thrust rods oppositely reciprocal within a housing driven by a reversible motor and chain. The rods are connected to the firewall and hood at pivotal connections. The connection on the hood may be slidable to provide clearance of obstacles such as engine compartment components. In an alternate embodiment, the upper thrust rod is pivotally connected to the interior of the hood and the distal end of the lower rod is pivotally attached to a second actuator which, when operated, will move the pivot point forwardly to achieve full or additional opening clearance of the hood. The actuator has a wide variety of applications where extended "reach" is desired.

8 Claims, 9 Drawing Sheets

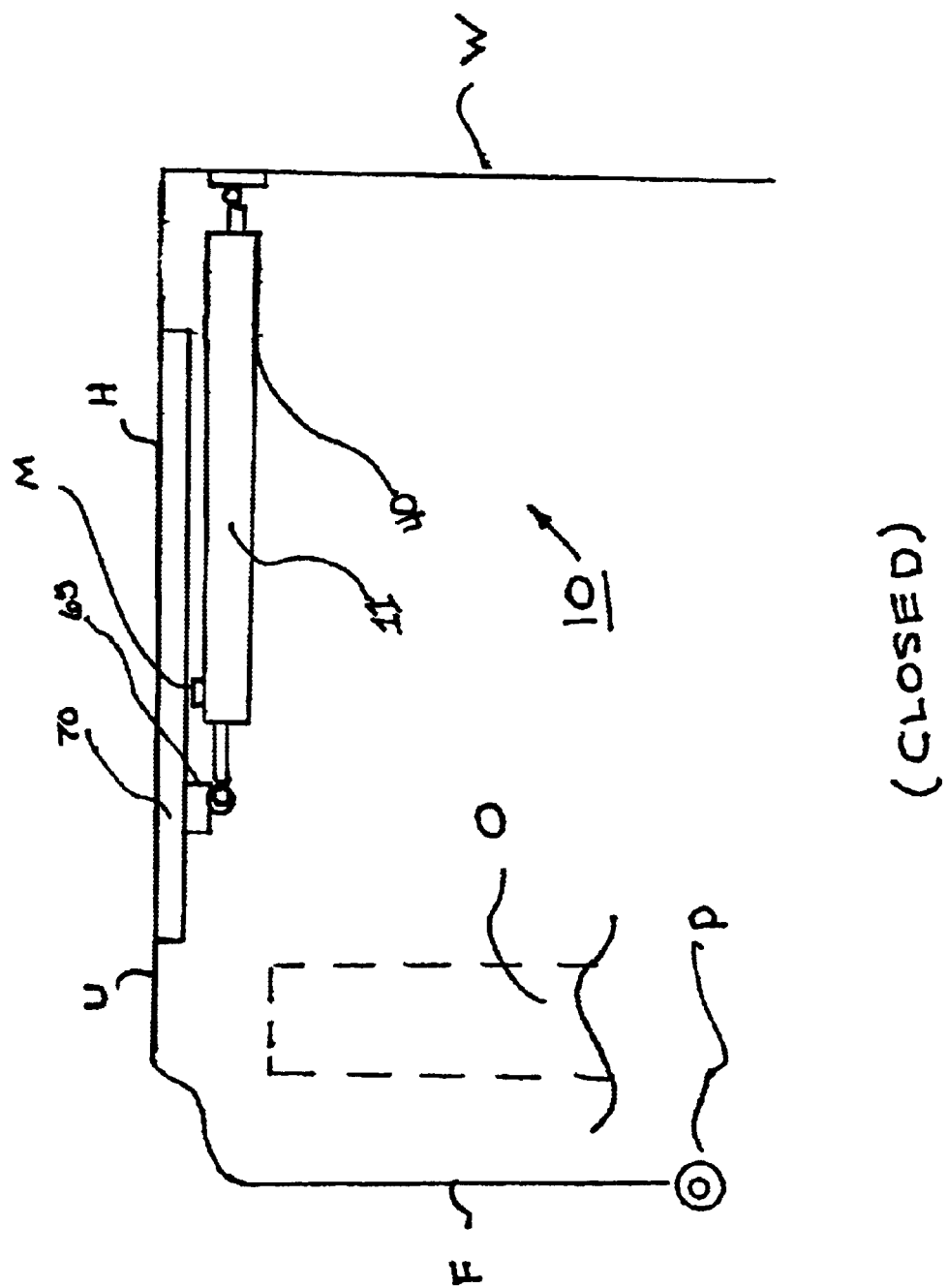
FIGURE 4 (CLOSED)

(PARTIAL OPEN)

FIGURE 7 (FULL OPEN)

LIFT FOR VEHICLE HOODS AND THE LIKE

CROSS REFERENCE TO RELATED APPLICATION

This application is based on provisional application Ser. No. 60/332,691 filed Nov. 16, 2001, entitled "Actuator For Vehicle Hoods and The Like."

FIELD OF THE INVENTION

The present invention relates to a lift which is capable of extending several times its retracted length and more particularly to a lift for opening and closing the hood of vehicles such as trucks.

BACKGROUND OF THE INVENTION

Long-haul trucks, such as those manufactured by Peterbilt, Kenworth and others, have an engine compartment enclosed by a hood. The hood normally pivots forwardly from the front to provide access to the engine compartment. These hoods are generally quite heavy and require considerable effort to raise the hood manually and may inadvertently close and possibly injure the operator or mechanic. Conventional truck hoods can weigh in excess of 300 lbs.

The present approach to hood lifts is to secure the large aluminum or fiberglass hood assembly using two large line-up pins which guide the hood assembly to a closed position for travel. Security is provided simply by rubber straps, one on either side at the lower firewall position, which the driver unhooks each time engine access is required. Over time, these straps can become weak and allow the hood assembly to shake and vibrate excessively during travel particularly on rough roadway conditions.

The hood opening function requires an actuator that provides an opening of at least 225% to expose sufficient engine area to enable the operator or mechanic to perform services such as checking the oil.

Further, many operators today are women or small stature individuals who have great difficulty opening and closing the vehicle hoods of these large trucks. The hood opening procedure involves the driver having to stand on the high front bumper and grasp the hood puller on the top of the radiator cover and apply full body weight to pivot the hood forwardly. This is a strenuous and sometimes dangerous task, particularly in adverse weather conditions.

Various attempts to design suitable power-driven hood openers or assists have been made. For example, air or hydraulic systems result in a irregular opening and closing speeds even with regulators. Telescopic extension devices are inadequate as they generally do not provide enough "reach" for the open hood to a position to provide adequate access for servicing.

A shortcoming of many of these devices is that a wind or draft created by a passing motor vehicle may blow the hood shut during an inspection causing possible injury to the operator or mechanic.

U.S. Pat. No. 5,730,239 does disclose a vehicle with a torsion bar hood assist. The torsion bar hood lift includes a torsion bar mounted with the free end positioned to engage and travel along a hood interior surface as the hood of the vehicle is opened and closed. As the hood is closed, the torsion bar bends to twist to store energy which is then transferred to the hood to assist in hood opening when the hood is lifted. The free end of the torsion bar supports a hood engagement member, such as a roller, to reduce friction between the torsion bar and the hood as the energy is transferred. The torsion bar is typically supported at two locations with a bearing block being used to further reduce friction. The free end of the torsion bar engages a hood reinforcing member or plate which may comprise a hood mounting bracket and travels against this plate during hood opening and closing.

Notwithstanding efforts in the prior art to provide various mechanical and electrical hood lift assists, such as that shown in the '239 patent, there nevertheless exists a need for an actuator which will provide an opening at least twice its original retracted length so it is functionally efficient to open the hood of trucks with the longest hood.

BRIEF SUMMARY OF THE INVENTION

Briefly, the present invention provides a vehicle hood lift which can be operated by the driver by a switch on the console, dash or other location. The massive hood, which is hinged at its lower, front corners, will safely open. Upon completion of servicing maintenance, the driver will depress the closing switch and the hood is closed and locked to secure the engine compartment.

The present invention provides a lift for closely controlling the speed of opening and closing and which actuator occupies very little space within the engine compartment so as to not interfere with the normal servicing maintenance of engine compartment components.

The present invention provides a lift that is simple, adaptable and easily installed so that it can be accommodated either as an original equipment manufacturer (OEM) or an after-market item on a wide variety of truck models.

The lift of the present invention includes a primary actuator consisting of a housing which supports a reversible electric motor having a shaft connected to a gear which drives a drive shaft. A square guide tube is received within the outer housing. The square guide tube slidably receives two thrust tubes which, in their retracted position, are arranged in side-by-side relationship. A chain extends within the guide tube and is driven by a sprocket which is driven by the drive shaft. One section of the chain is connected to one of the thrust tubes and the other chain section is connected to the other of the thrust tubes so as the endless chain is driven in the direction the thrust tubes will extend from the housing in opposite directions to provide a lifting or extension force.

In one embodiment, the outer end of the one thrust tube is connected to a slidable pivot on the underside of the hood. The slidable pivot is connected to a linear actuator such as a pneumatic cylinder. The distal end of the other thrust tube is pivotally connected to a location such as the frame or firewall. In the event there is an obstacle or obstruction in the way blocking the full extension of the thrust tubes, a micro-switch will actuate the pneumatic cylinder to move the pivot point to a location so that further extension will avoid the obstacle allowing the hood to fully open. Operation of the electric motor in the opposite direction will retract the tubes closing the hood.

In another embodiment, the distal end of the lower thrust tube is pivotally connected to the truck frame structure at a secondary actuator. The distal end of the upper thrust tube is pivotally connected to the interior of the hood. The primary actuator is actuated and when the thrust tubes are fully extended, the secondary actuator is energized which moves the pivot point of the lower thrust tube forwardly (toward the front of the vehicle) to obtain greater hood opening arm access.

The lift, although described with reference to a hood opening, has a variety of applications where extended "reach" is desired.

BRIEF DESCRIPTION OF THE DRAWINGS

The above and other objects and advantages of the present invention will become more apparent from the following description, claims and drawings in which:

FIGS. 4 to 7 are schematic views showing the sequence of operations that occur during the opening of a vehicle hood;

DETAILED DESCRIPTION OF THE DRAWINGS

Figure 1:
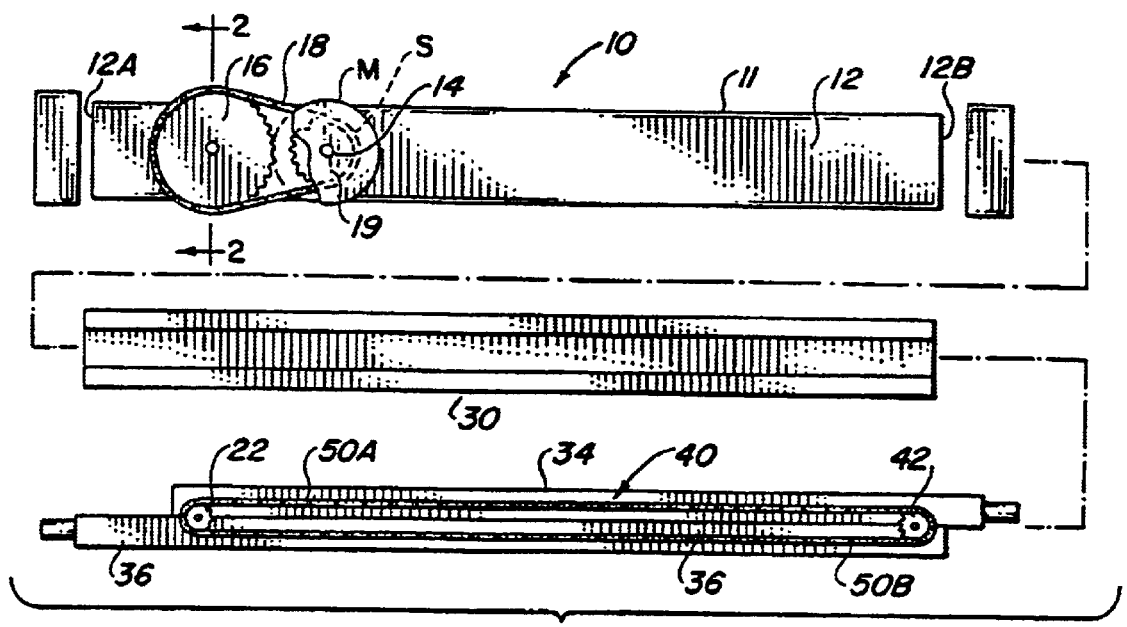
FIG. 1 is an exploded view showing the primary actuator of the present invention.
Figure 2:
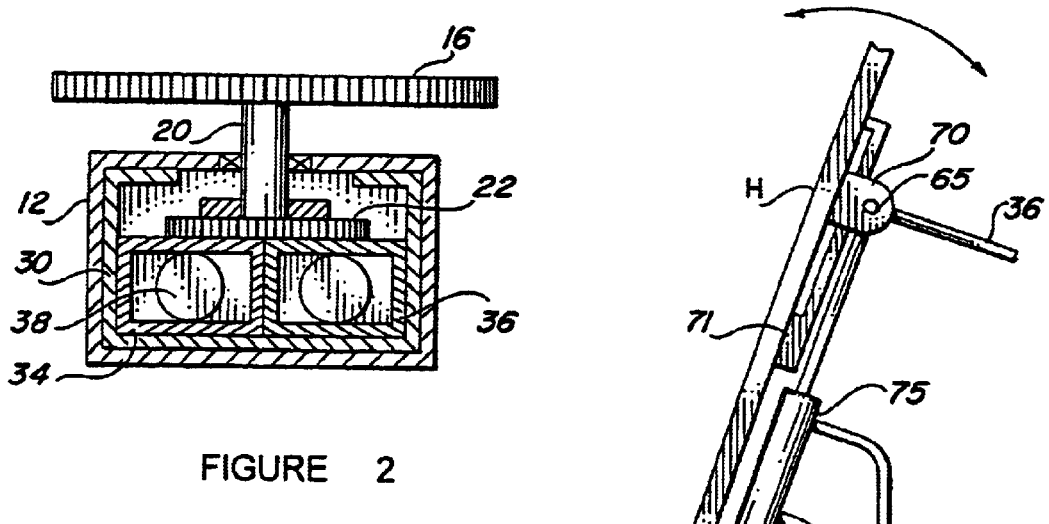
FIG. 2 is a cross-sectional view of the primary actuator.

Turning now to the drawings, particularly FIGS. 1 to 7, an embodiment of the lift of the present invention is generally designated by the numeral 10. The lift is shown in FIGS. 3 to 6 in the environment of a lift for a truck hood H of the type utilized on large, over-the-road tractors. The hood H opens forwardly having an upper section U and a front section F forming an enclosure. The hoods are generally aluminum or fiberglass and are secured by a large line-up pins in the closed position, not shown. The hood H pivots at the lower end of the front section at pivot P and conventional procedure requires the driver having to stand on the high front bumper and grasp a hood puller on the top of the front cover and exert a pulling force towards the front of the truck. As pointed out above, this is a difficult and sometimes dangerous task.

The lift 10 of the present invention has a primary actuator 11 extendable to more than twice its retracted length to raise a hood. It should be appreciated that while the invention is described with reference to application as an apparatus for operating a vehicle hood, the invention provides metered speed and motion and may be used in many other applications such as medical applications, as well as other applications such as log carriage drives, saw mills, door openers and other situations where other applications where a reliable actuator which will open to several times its retracted length required.

The actuator 11 has a generally elongate housing 12 which is shown as being generally square in cross-section. The housing 12 may be formed from a section of square tube having opposite ends 12A, 12B and defines a generally square interior. An electric motor, such as a 12V DC reversible gear motor M, is mounted adjacent one end of the housing. The gear motor has an output shaft 14 carrying a gear 19 which drives an adjacent sprocket 16 by means of a chain 18. The sprocket is carried on a shaft 20 which is mounted in bearings on the housing and extends to the interior of the housing having a drive gear 22 within the housing. The motor, gear and sprocket are selected to provide the desired speed of reciprocation. In the case of an actuator for the hood of a large tractor, it has been found that an operating speed in the range of 180 inches per minute (IPS) has been found suitable.

A generally square guide tube 30 is secured within the outer housing. Preferably the guide tube is, for example, 1¾" square tubing which provides a bearing surface for reciprocation of the thrust rods 34, 36 as will be explained. The square guide tube may be of a suitable material such as a polished steel to reduce frictional resistance.

Reciprocal within the square guide tube are thrust rods 34, 36. The thrust rods are shown as being generally square and reciprocally positioned adjacent one another within the guide tube 30.

In order to reinforce the thrust rods, a reinforcing member, which is shown as a generally circular rod 38, extends through the bore of each of the thrust rods. The reinforcing members each have a length generally corresponding to the length of the thrust rod. However reinforcing rods are fixed or otherwise secured in the housing so that as the thrust rods extend, the reinforcing rods 38 remain fixed guiding the extension of the thrust rods. Reinforcing rods 38 are secured by a locking pin or bolt to the housing 12.

Opposite reciprocation of the thrust rods is imparted by a chain drive. As pointed out above, a drive sprocket 22 is located within the housing driven by the gear motor chain and drive gear arrangement. The drive sprocket receives a pintle chain 40 in the form of an endless loop. The pintle chain 40 extends around an idler sprocket 42 rotatively secured within the housing at one end of the housing 12. Thrust rod 34 is secured by a pin lock at 50A to the pintle chain 40. The opposite thrust rod 36 is secured to the pintle chain at 50B on the opposite run of the chain. Thus, it will be seen as the pintle chain 40 is driven in an endless loop, the thrust rods will extend from opposite ends of the housing 12.

Thrust rod 34 is secured at pivotal a connection with a suitable location, such as on the firewall W of the vehicle. The opposite thrust rod 36 is pivotally secured to a fixed location on the object to be lifted, such as the interior of the hood H. In the closed position (FIG. 4), the primary actuator 11 is retracted allowing the hood to assume a normal closed position. The electric motor M is connected to a suitable source of power, such as the electrical system of the vehicle.

A switch S is located at a convenient location such as on the vehicle console, dashboard or exterior of the vehicle. Actuation of the switch S will cause the motor to rotate in one direction driving the endless chain, which in turn drives the thrust rods in opposite directions, imparting an opening motion to the hood, as seen in FIG. 4. A micro switch M1 is located so that, upon predetermined extension of the actuator, the motor M will be shut off. For example, the micro switch M1 can be located on the thrust rod 36 and maintained in a closed position until the actuator rod reaches a certain position clearing the housing at which time the micro switch will shift to a position to shut off power to the motor M. The operator may then close the hood by moving the switch S on the console causing the motor to operate in a direction to retract the thrust rods. A second micro switch M2 located on the vehicle will sense when the hood is fully closed, terminating power to the motor.

Figure 3:
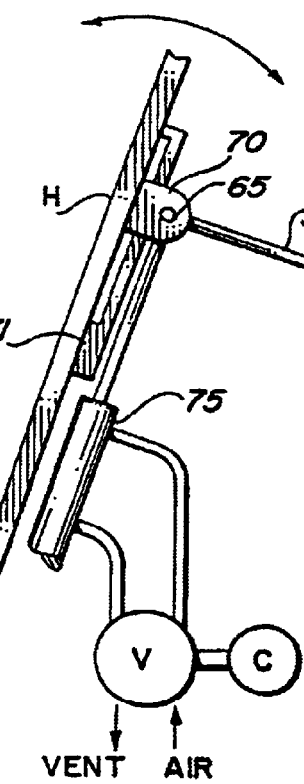
FIG. 3 is a detail view of the sliding pivot on the underside of the hood.
Figure 9A:
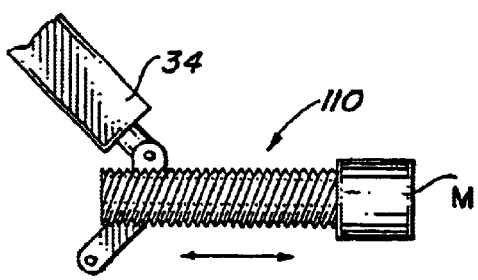
FIG. 9A is a detail view of the secondary actuator as indicated in FIG. 9.
Figure 5:
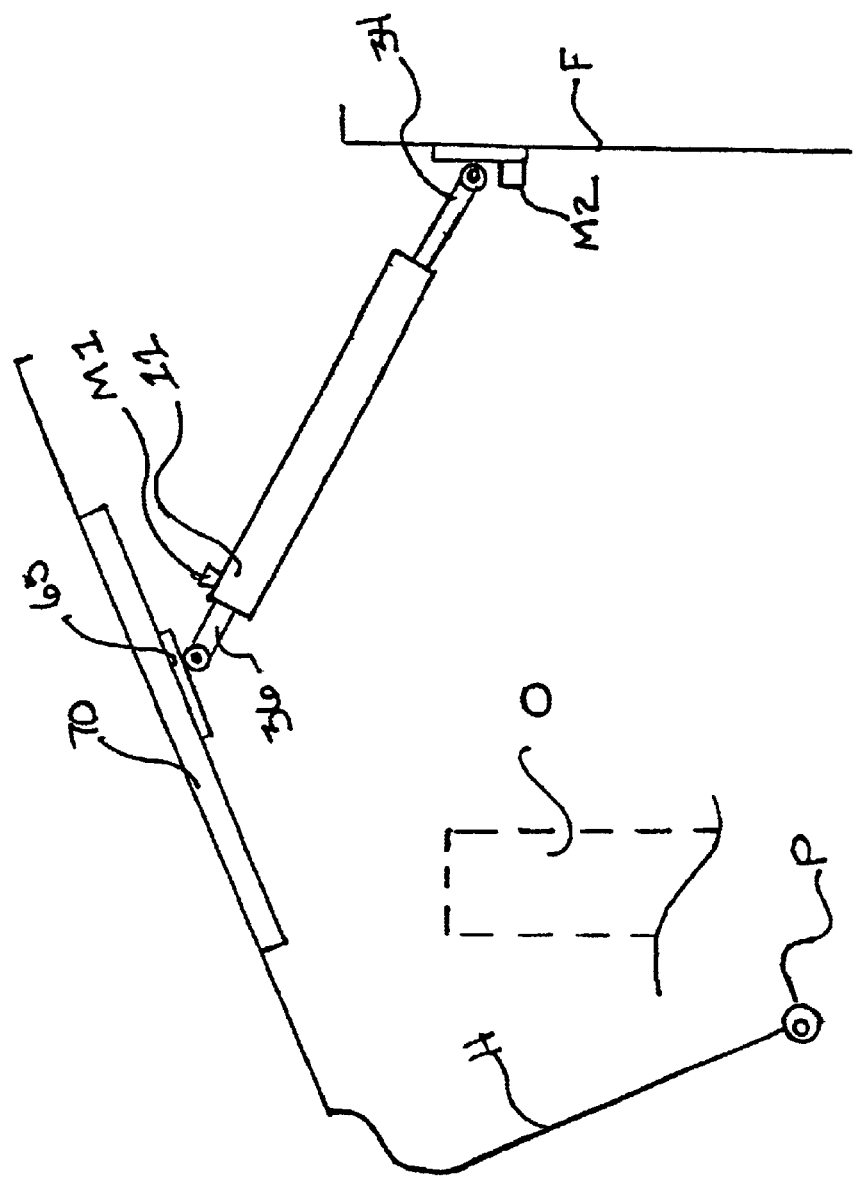
Figure 6:
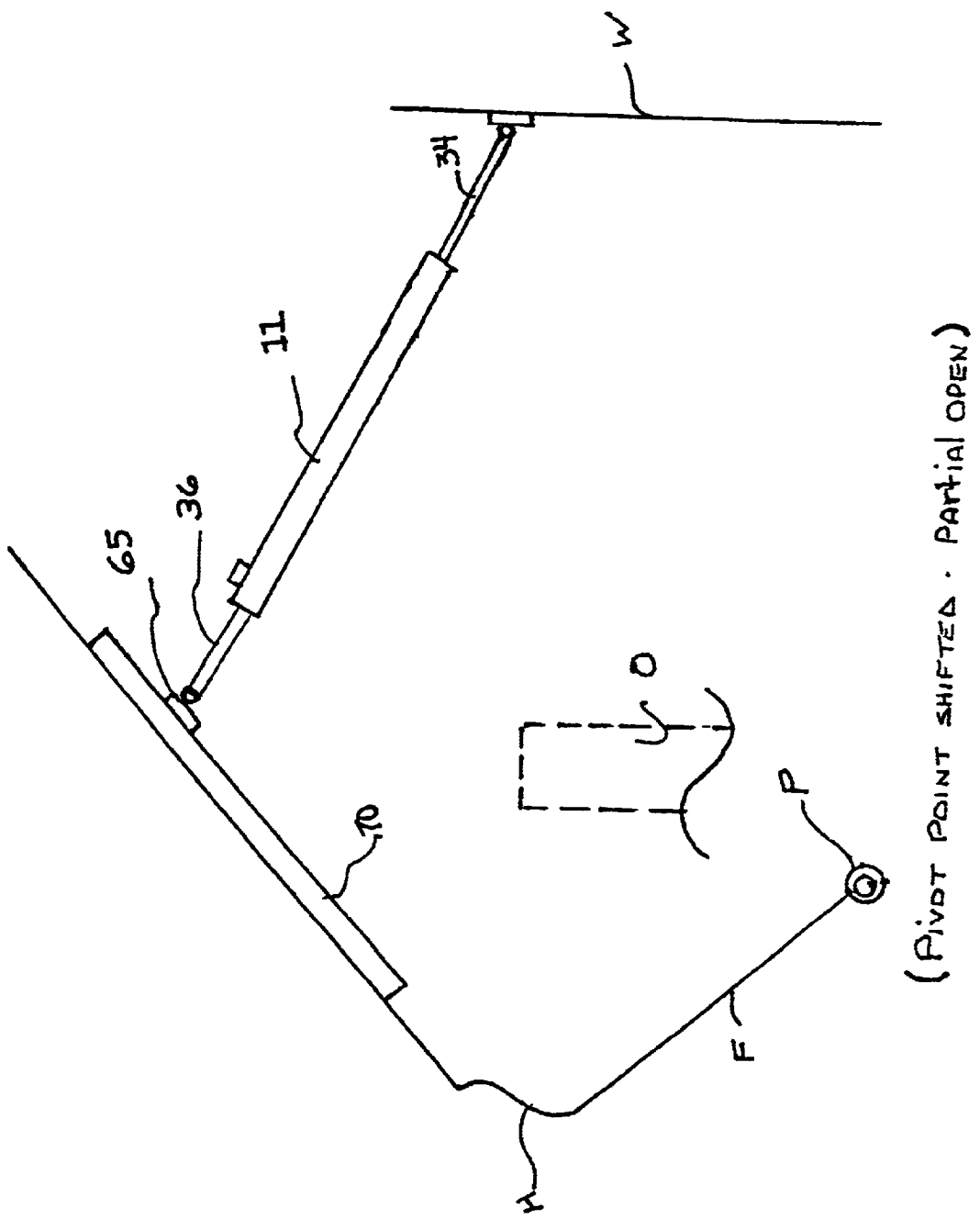
Figure 7:
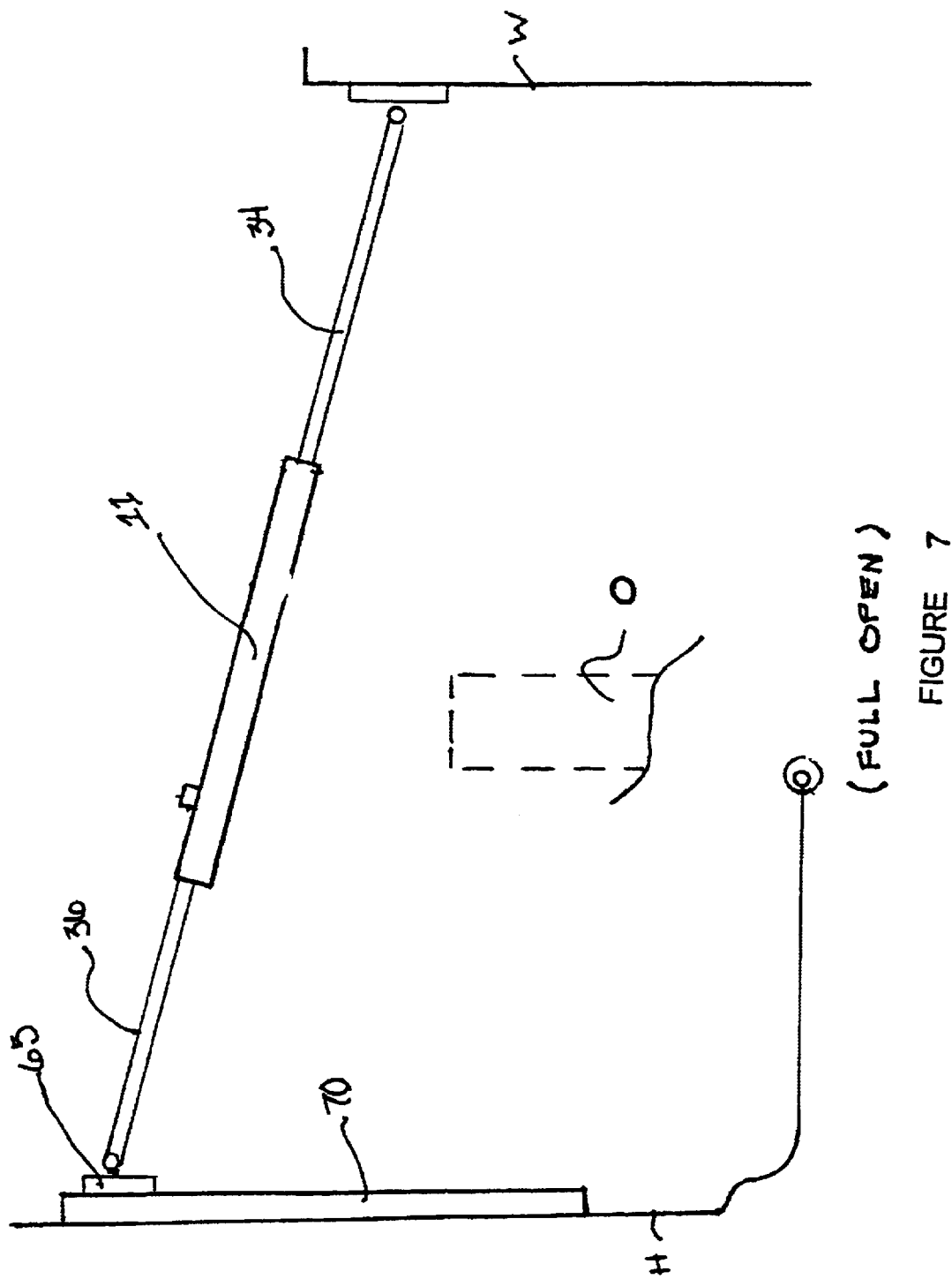

In some instances, there may be obstacles O which will interfere with the normal linear extension of the actuator 11. For example, in some vehicles, a radiator will extend to an elevation which will interfere with extension of the rod. In this instance, as shown in FIG. 3, the pivotal connection 65 on the thrust rod at the underside of the hood is reciprocal along a slide 70 in a track 71. The slide 70 is connected to a small pneumatic actuator 75 which, in turn, is connected to a valve V which is a four-way valve selectively delivering a supply of air pressure to either the head or the rod end of the pneumatic actuator 75. The valve is an electric valve and operated by micro switch M1 which will sense the position of one of the thrust rods. For example, when a thrust rod reach a predetermined length of extension as it approaches an interfering object O, such as the radiator, the micro switch M1 will interrupt the further extension of the actuator and activate the valve controller C to direct pressurized air to the head end of the cylinder causing the cylinder to extend moving the slide 70 and the pivotally connection point 70. It is preferred that the operation of the actuator be interrupted at approximately midway in its operation when the hood is at approximately 45°. In this position, most hoods are in an approximately "balanced" position so the forces exerted on the actuator are reduced. Once the pivot point reaches the end of the slide, the actuator 10 will resume extension allowing it to fully extend, clear of any obstruction, and moving the hood to a fully open position, as seen in FIG. 6.

The closing operation is basically the reverse of the opening operation. The switch S is actuated to a "close" position and the motor M will operate in the reverse direction causing the thrust rods to retract. At a predetermined position, generally at the approximate balance point of the hood and after any obstacles are avoided, the pivot connection 65 will be moved to a lowered position. Retraction of the thrust rods 34, 36 then continues until the hood is in a closed position (FIG. 3).

The pneumatic cylinder 75 may also be utilized to maintain the hood in a closed position. With the cylinder 75 retracted when the hood H is closed and the rod end is maintained in a pressurized condition and the actuator is retracted, the hood will be held closed.

From the foregoing, it will be seen that the present invention provides an actuator which is simple, provides a wide selection of speed and power choices, and which has the capability to extend to several times its original length. This allows for compact storage. The actuator has numerous applications from heavy industrial vehicle applications to application in medical devices.

An alternate embodiment of the lift is shown in FIGS. 8 to 11, generally designated by the numeral 100 in which like numerals are used to denote elements which are the same as those described above. In this embodiment, the lift 100 is provided with a primary actuator 11 as has been described in detail with reference to previous figures. One thrust rod 36 is pivotally connected to the interior of the hood H at pivot point P1. The primary actuator extends to open the hood to the partially open position shown in dotted lines in FIG. 8. The closed hood position is also shown in this Figure in solid lines.

Figure 8:
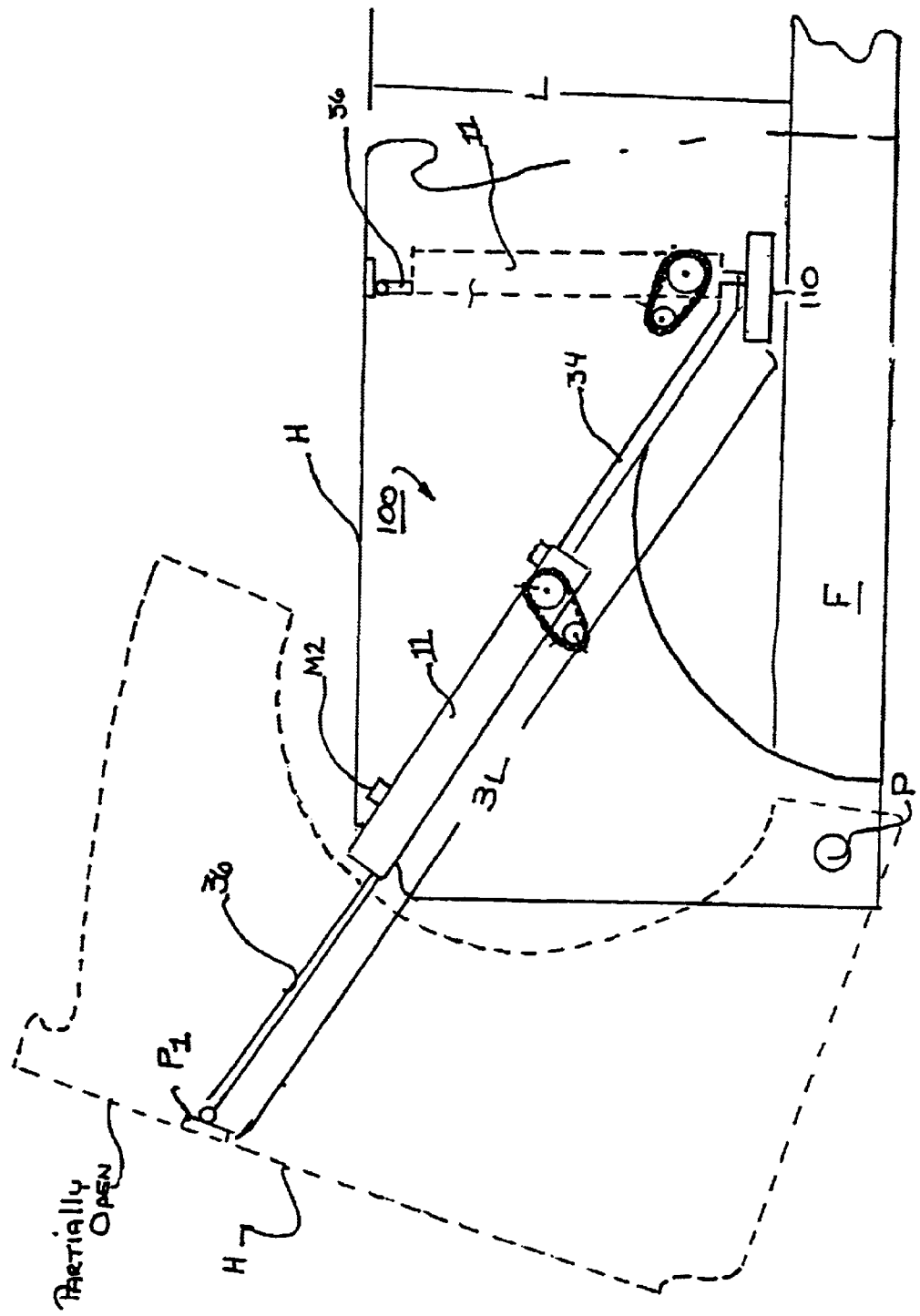
FIG. 8 is a view showing another embodiment having a secondary actuator with the hood partially open in dotted lines.
Figure 9:
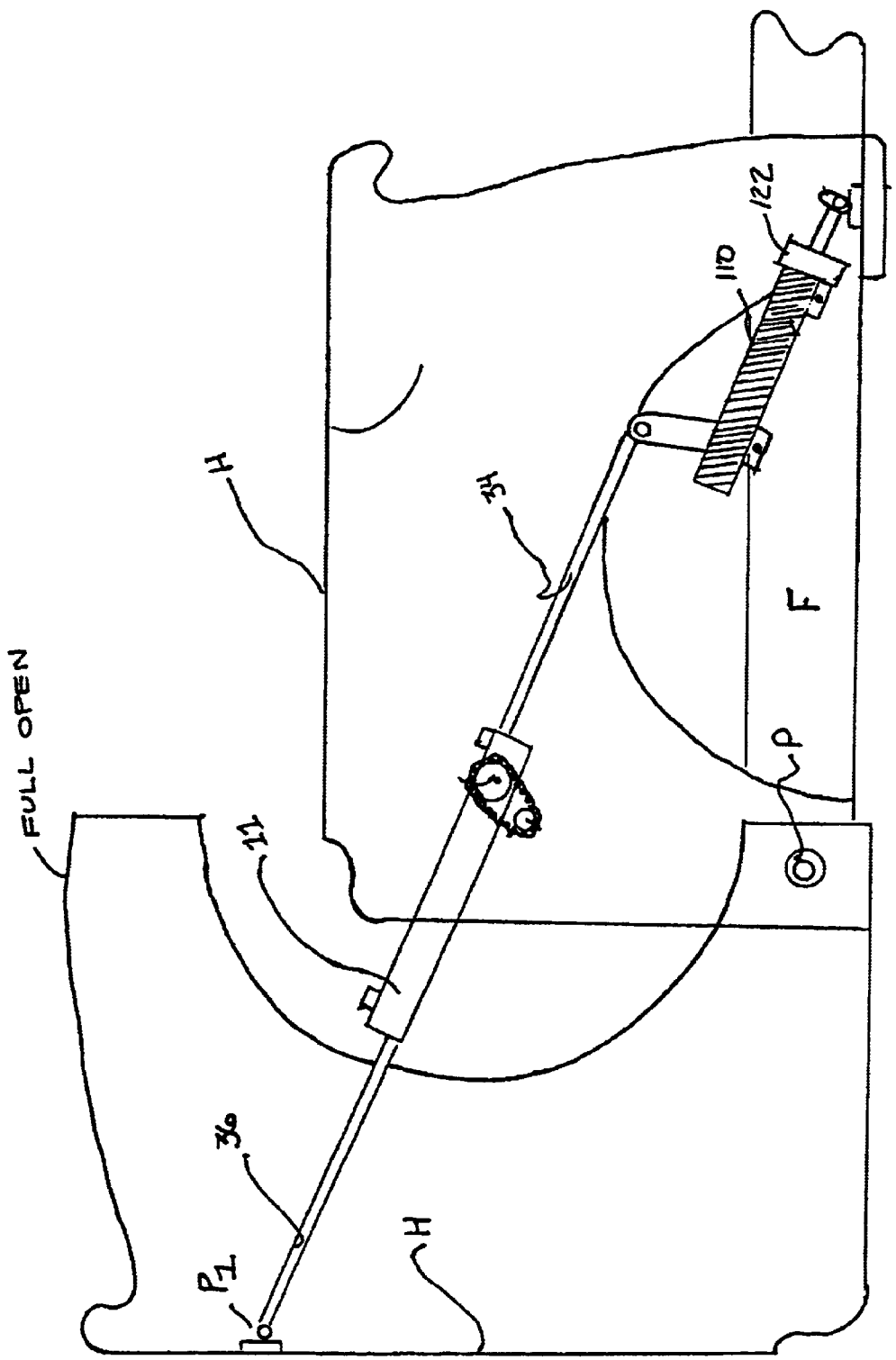
FIG. 9 is a view similar to FIG. 8 with the hood fully open.
Figure 10:
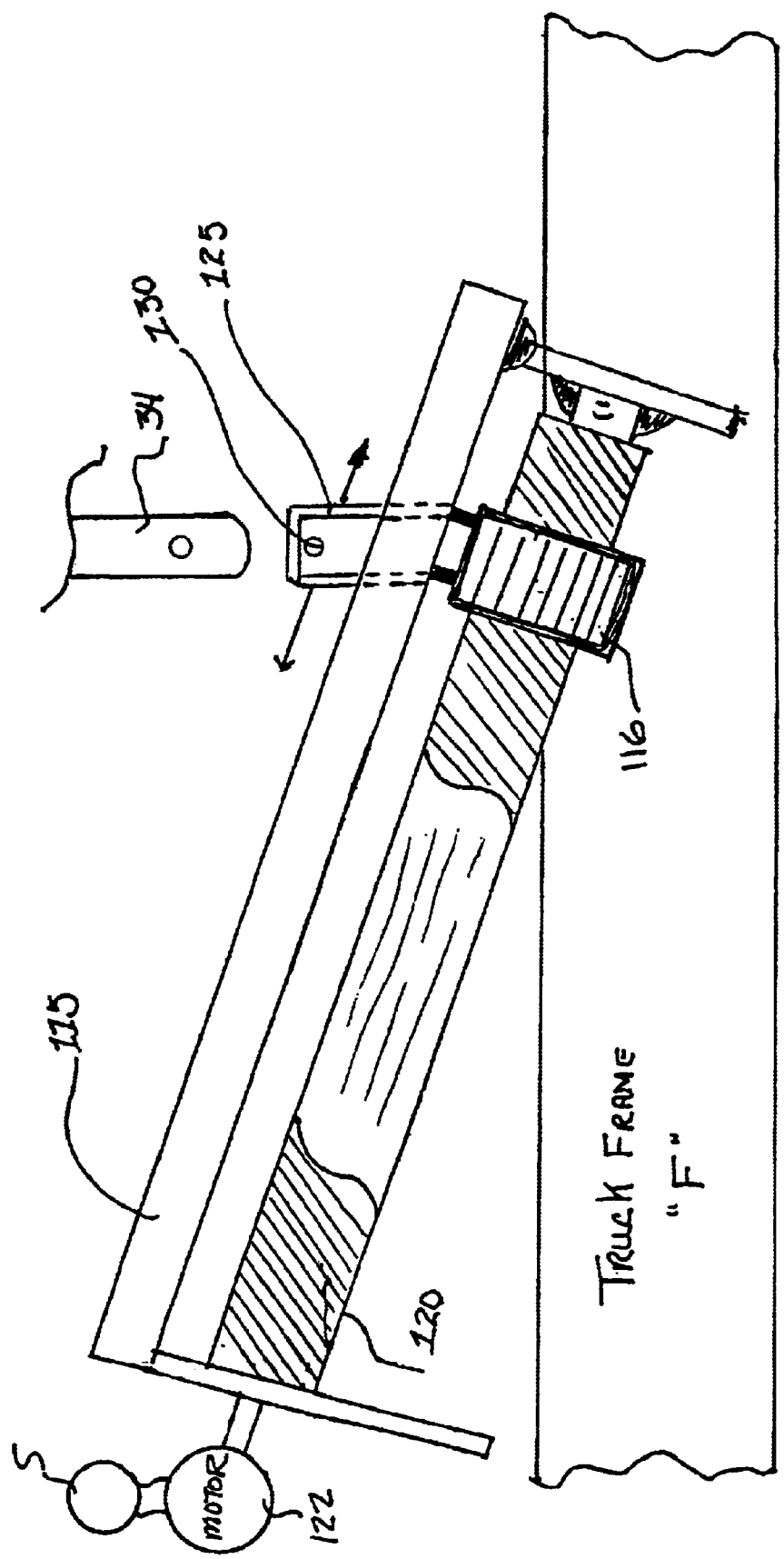
FIG. 10 is a side view, partly broken away, of the secondary actuator.
Figure 11:
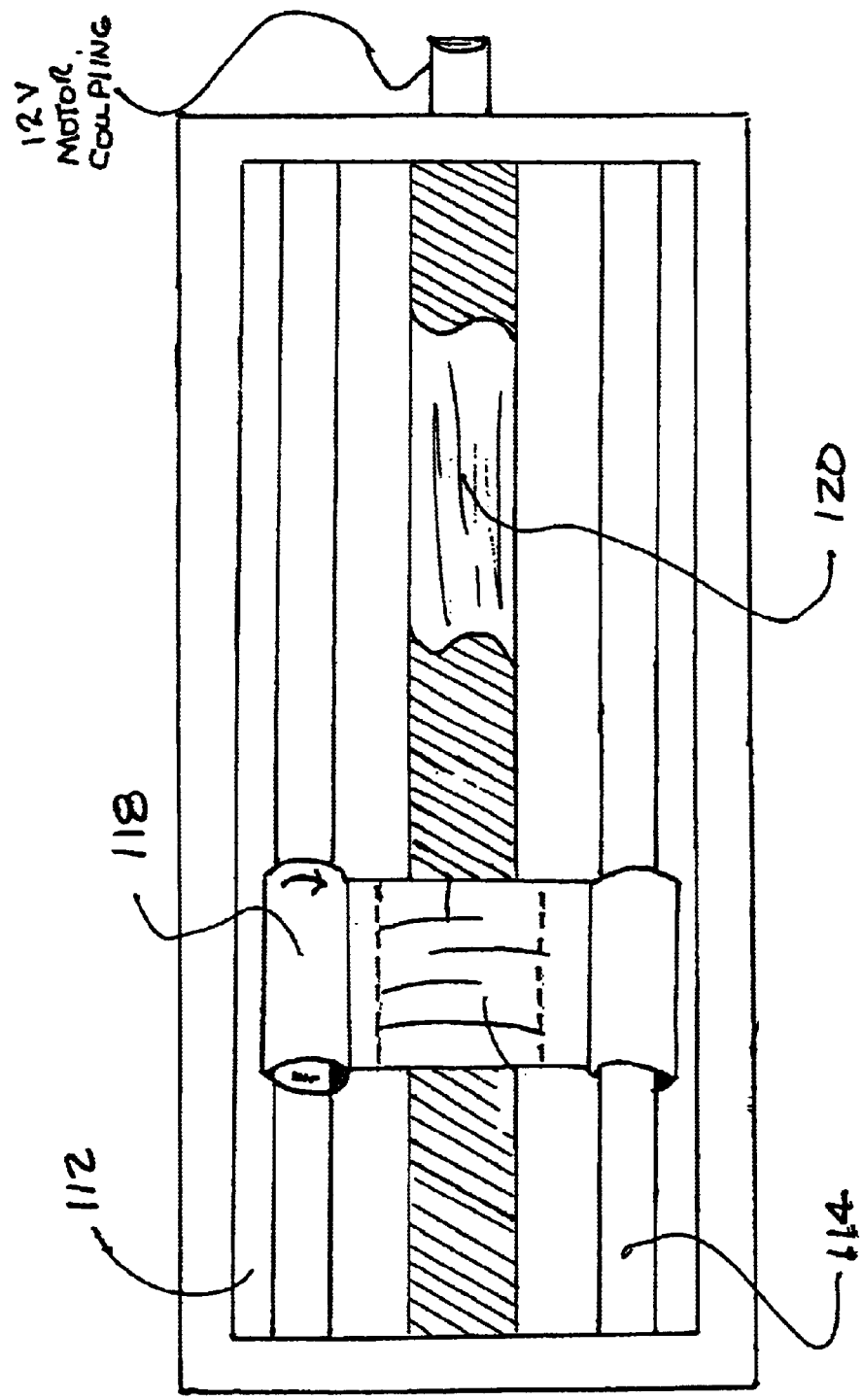
FIG. 11 is a top view of the secondary actuator.

In the open position, as shown in dotted FIG. 8, the hood has reached a position less than 90° with respect to the frame F. Further opening is restricted as the extension available is limited by the space available in the engine compartment. The primary actuator 11 must fit within the space L and the extended length is approximately 3L which is insufficient to provide full opening to 90°. The retracted position of the actuator 11 is shown in dotted lines in FIG. 8.

In the embodiment 100, a secondary actuator 110 is provided which is operable to move pivot point P2 forward to achieve fill opening upon extension of the primary actuator.

The secondary actuator has a frame 115 with a pair of parallel guide rods 112, 114 which guide the reciprocation of follower 116 along side 118. Follower 116 is in threaded engagement with lead screw 120 which is reversibly driven by motor 122. Motor 122 is operably connected to the vehicle electrical system across switch S on the vehicle console which controls the operation of the system.

A connector 125 receives the distal end of thrust rod 34 of the primary actuator at pivotal connection 130. The frame 115 is secured to the vehicle frame F in a generally horizontal position adjacent the firewall.

The following sequence occurs:

The operator depresses switch S which energizes the primary actuator 11 causing the opposed thrust rods 34, 36 to fully extend raising the hood to a partially open position. When the extension of actuator 11 is maximized, the switch S will then energize motor 122 causing the lead screw 122 of the secondary actuator 110 to rotate in a direction moving the follower 116 and the lower pivot point 130 forwardly achieving a full open hood position. The two actuators can operate sequentially or simultaneously to achieve full open.

It has been found in actual tests that only about 12" to 14" travel of the follower of the secondary actuator is required to achieve full hood opening for most current models of trucks although the axial length can be increased or decreased as required by the installation requirements.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A lift for raising and lowering a hood of a vehicle comprising:

(a) an actuator having an axially extending housing having opposite ends;

(b) a pair of thrust rods in said housing oppositely reciprocal between a retracted position and an extended position, said rods adjacent one another in a side-by-side relationship in the retracted position one rod having an outer end pivotally attachable to said vehicle at a first location and the other thrust rod pivotally attachable to said hood at a second pivot location; and (c) drive means for oppositely reciprocating said thrust rods to extend said rods from opposite ends of said housing to achieve a fully extended length approaching the combined length of the rods and housing.

2. The lift of claim 1 wherein said drive means comprises a motor-driven, endless chain and wherein said thrust rods are attached to said chain.

3. The lift of claim 2 wherein said motor is an electric motor connected to the electrical system of a vehicle across a switch.

4. The lift of claim 1 further including switch means for interrupting reciprocation of said actuator and further including means for moving said second pivot location.

5. The lift of claim 4 wherein said means for moving said second pivot location comprises a pneumatic cylinder.

6. The lift of claim 4 wherein said switch means are operable at the approximate balance point of the member.

7. The lift of claim 1 further including means for maintaining the hood in a closed position.

8. A lift for raising and lowering the hood of a vehicle comprising:

(a) an actuator having a generally rectangular housing having opposite ends;

(b) a generally rectangular guide tube in said housing;

(c) generally rectangular thrust rods in said guide tube arranged in side-by-side relationship, said thrust rods having a retracted position and an extended position in which the thrust rods extend from the opposite ends of the housing; and (d) drive means for reciprocating said thrust rods including a motor driving a sprocket, an endless chain extending in said housing driven by said motor and sprocket and connector means connecting said thrust rods to selected locations along said chain to oppositely reciprocate said rods.

* * * * *